US007665026B2

(12) United States Patent
Janesky (10) Patent No.: US 7,665,026 B2
(45) Date of Patent: Feb. 16, 2010

(54) SYSTEM FOR SELECTION OF REMEDIATION APPLICATIONS FOR WORKSPACE

(76) Inventor: Lawrence M. Janesky, 60 Silvermine Rd., Seymour, CT (US) 06483

( * ) Notice: Subject to any disclaimer, the term of this patent is extended or adjusted under 35 U.S.C. 154(b) by 309 days.

(21) Appl. No.: 11/269,314

(22) Filed: Nov. 8, 2005

(65) Prior Publication Data

US 2007/0106572 A1  May 10, 2007

(51) Int. Cl.
*G06F 3/048* (2006.01)
*G06F 17/30* (2006.01)
(52) U.S. Cl. .................. 715/765; 715/810; 715/962; 715/757; 705/27
(58) Field of Classification Search ............ 715/747, 715/757, 765, 823, 962, 810; 705/27
See application file for complete search history.

(56) References Cited

U.S. PATENT DOCUMENTS

| | | | | |
|---|---|---|---|---|
| 4,136,500 | A * | 1/1979 | DiFiore | 52/741.13 |
| 6,727,925 | B1 * | 4/2004 | Bourdelais | 715/852 |
| 7,062,722 | B1 * | 6/2006 | Carlin et al. | 715/850 |
| 7,076,455 | B1 * | 7/2006 | Fogelson | 705/27 |
| 7,246,085 | B2 * | 7/2007 | Kamon et al. | 705/26 |
| 2004/0155109 | A1 * | 8/2004 | Kenney et al. | 235/462.45 |
| 2005/0160014 | A1 * | 7/2005 | Moss et al. | 705/26 |

OTHER PUBLICATIONS

"SearchCIO-Midmarket.com Definitions", Jun. 18, 2001, techtarget.com.*
Shohet, Igal M. and Galil, Ittamar. Decision Support System for Waterproofing of Below-Grade Structures, Mar. 2005, Computer-Aided Civil and Infrastructure Engineering, p. 206.*

* cited by examiner

*Primary Examiner*—Namitha Pillai
(74) *Attorney, Agent, or Firm*—Perman & Green, LLP (57) ABSTRACT

A system for marketing applications having a computer processor, a display and a user interface for receiving instructions from a user. The user interface is operably connected to the computer processor. The computer processor is programmed to display an application menu on the display for selection of an application from the application menu by the user and further programmed to maintain a list of user-selected applications and further programmed to display a depiction of a predetermined environment on the display. The depiction includes images of applications included in the list of user-selected applications shown applied in the predetermined environment. The computer processor is further programmed to update the depiction of the predetermined environment by adding an image of the application, as applied in the predetermined environment to the depiction of the predetermined environment on the display, in response to a selection of the application by the user.

24 Claims, 11 Drawing Sheets

SYSTEM FOR SELECTION OF REMEDIATION APPLICATIONS FOR WORKSPACE

BACKGROUND

1. Field

The disclosed embodiments relate to computer systems and, more particularly, to a computer system for selection of remediation applications for basements, crawl spaces, and partially subterranean chambers of structures.

2. Brief Description of Related Developments

There are many known computer systems and programs for marketing products, including installed products. Internet web pages and interactive presentations distributed on compact disks are often used for marketing purposes. Known systems may display visual images of individual products being marketed. If the products are generally sold with installation services, images of completed installation projects may be shown, such as past projects that have been completed by installer. These images aid in marketing by allowing a prospective consumer to see how installed products appear in the environment in which they are installed. However, different consumers have different product requirements. Moreover, many consumers seeking remediation of an environment or workspace, such as a basement, crawlspace, or partially subterranean chamber of a dwelling in need of water proofing or sealing, and desiring products/services for remediation of the workspace, may not know what is required in order to identify which products/services will effect the sought remediation. In other words aside from generally desiring remediation of the workspace, many consumers may not know the specific remedial areas of the workspace and the products/services to provide remediation. Therefore the products shown in images of completed installations are unlikely to provide consumers with desired information allowing the consumer to source the desired products, services, or combination thereof, to effect satisfactory remediation. It is desired to provide a system to assist a consumer in identifying specific conditions in an environment, such as a basement in need of remediation and products and services available to effect remediation.

SUMMARY

In accordance with one exemplary embodiment, a computer system for marketing applications comprises a computer processor and a display screen operably connected to the computer processor. The computer system further comprises a user interface for receiving instructions from a user, the user interface being operably connected to the computer processor. The computer processor is programmed to display an application menu on the visual display screen for selection of an application from the application menu by the user. The computer processor is further programmed to maintain a list of user-selected applications. The computer processor is further programmed to display a depiction of a predetermined environment on the display screen, the depiction including images of applications included on the list of user-selected applications shown applied in the predetermined environment. The computer processor is further programmed to update the depiction of the predetermined environment by adding an image of the application as applied in the predetermined environment, to the depiction of the predetermined environment on the display screen, in response to selection of the application by the user.

In accordance with another exemplary embodiment, a computer code embedded in a computer-readable medium comprises instructions for displaying an image of an arrangement of features related to a workspace to be modified and instructions for displaying a menu of application presentations. The code further comprises instructions for allowing a user to select an application presentation from the menu of application presentations and instructions for storing a list of selected applications in a computer memory. The code further comprises instructions for allowing a user, while viewing the selected application presentation, to add an application shown in the selected application presentation to the list of selected applications. The code further comprises instructions for displaying a modified image of the arrangement of features related to a workspace, showing the applications as applied to the workspace.

In accordance with yet another exemplary embodiment, a computer code embedded in a computer-readable medium. The computer code comprises instructions for displaying an image of an arrangement of features indicating a chamber, instructions for displaying a menu of applications for the chamber, and instructions for allowing a user to select an application from the menu of applications. The chamber is at least a partially subterranean chamber. The instructions allow user to specify a predetermined characteristic of said application. The code further comprises instructions for storing a list of selected applications and user specified characteristics in a computer memory and instructions for displaying a modified image of the arrangement of features indicating the chamber, showing the applications as applied to the chamber. The code further comprises instructions for obtaining a price for each selected application and instructions for generating a purchase order for the list of selected applications and user specified characteristics.

BRIEF DESCRIPTION OF THE DRAWINGS

The foregoing aspects and other features of the present invention are explained in the following description, taken in connection with the accompanying drawings, wherein.

DETAILED DESCRIPTION

Figure 1:
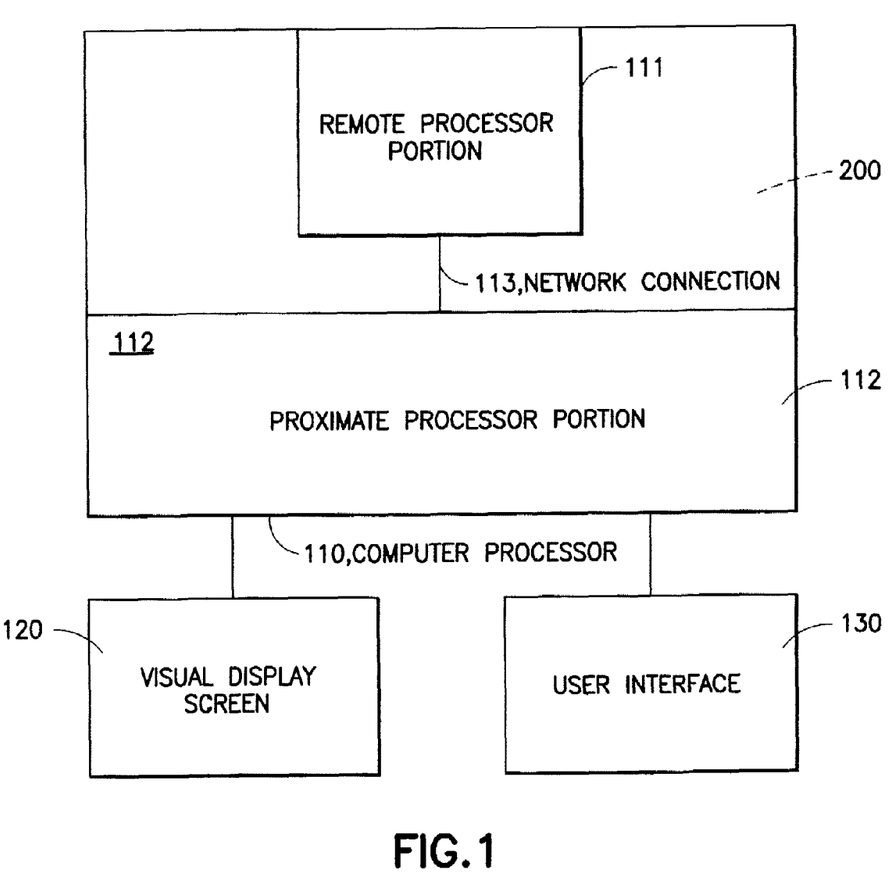
FIG. 1 is a schematic representation of a system incorporating aspects in accordance with an exemplary embodiment.

FIG. 1 shows, in schematic form, a system 100 incorporating features in accordance with an exemplary embodiment. The system comprises a computer processor 110, a visual display screen 120, and a user interface 130. The computer system may be a conventional general purpose computer system with a CRT or LCD display screen 120, and a mouse or keyboard as the user interface 130. In other embodiments, any suitable computer system may be used. Also, the display 120 and user interface 130 need not be separate devices. For example, a touch screen may be used for both the display 120 and the user interface 130. The computer system may be a stand alone system, or may be connected to other systems such as via a local area network or the internet. For example, computer processor 110 may comprise both a proximate portion 112 and a remote processor portion 111, which are connected via a network 113 such as the internet. This may allow the screen layouts and processes as described below, including the processes illustrated in FIG. 2, to be implemented over a web interface. Either the proximate or remote processor portions may be one or more servers, located in any desired location and communicating with any desired number of access stations.

Figure 2:
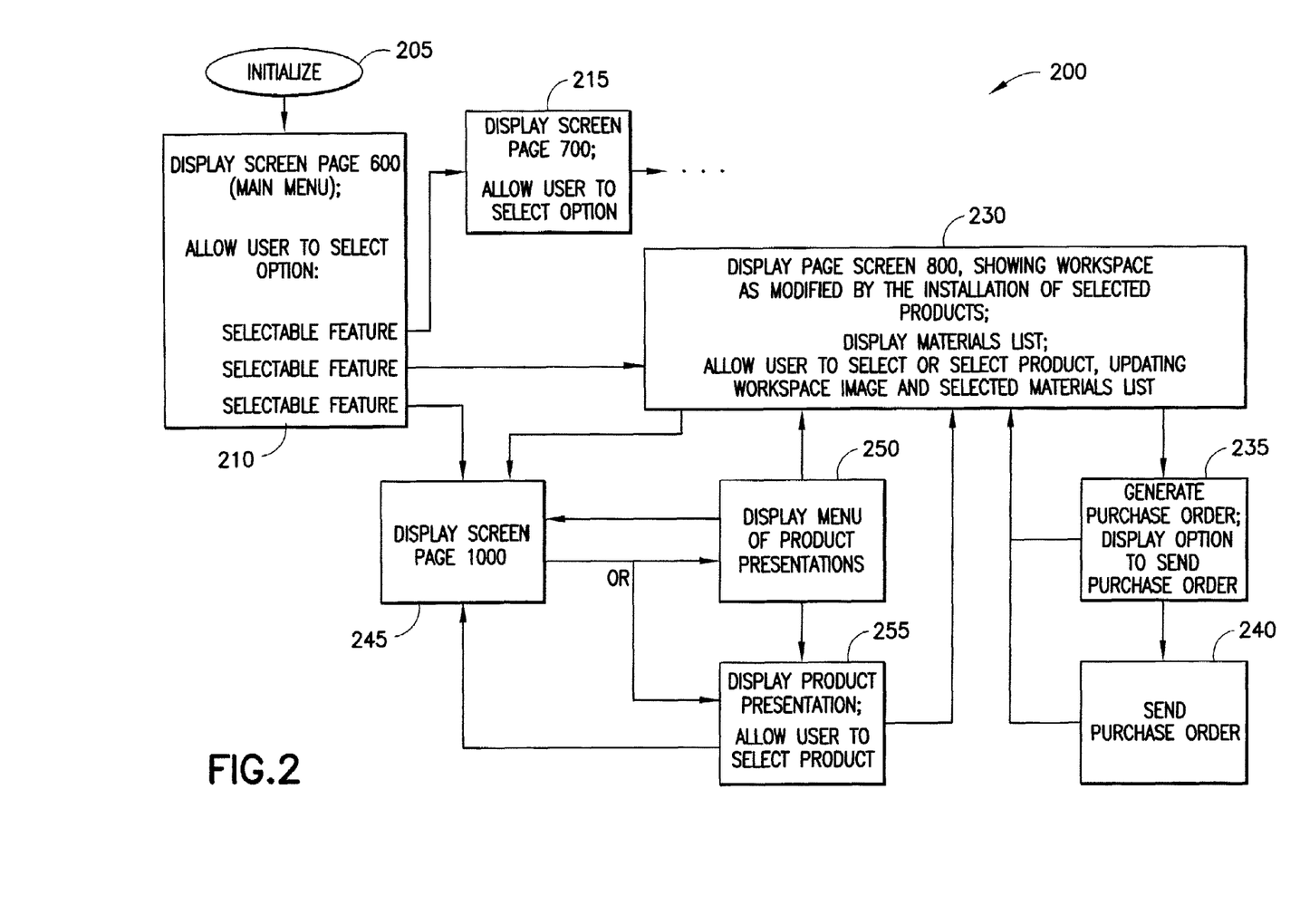
FIG. 2 is a schematic diagram illustrating aspects of the system in FIG. 1.

FIG. 2 is a schematic diagram illustrating aspects of the system 100 in FIG. 1. The diagram in FIG. 2 provides an overview of a computer program 200 stored in the computer processor 110 shown in FIG. 1. The process defined by the diagram shown in FIG. 2 may be implemented using a computer code comprising instructions that may be executed by the computer processor 110. The code may be embodied in a computer-readable medium such as a magnetic or optical disk, programmable memory chip, or any other computer-readable medium. In one embodiment, the code may be recorded on a compact disk. In another embodiment, the code may be in the form of an executable script that is transmitted from a server (for example processor 111) to a client computer (e.g. processor 112) operated by a user, as may be the case with an internet web page. Also, the code may be distributed among several computers. This may be the case where a portion of the code is executed by an internet server and another portion is executed by a user's computer, connected to the sever via the internet.

Referring still to FIG. 2, the program 200 may be initiated in block 205 by a user or administrator, or otherwise initiated. If the program is to be implemented on an in-store kiosk, motion sensors may initiate the program in block 205 upon sensing the approach of a consumer. Initialization of the program may, for example, queue an introduction display or presentation (e.g. "BASEMENT VISION"™) with moving or still images, audio or text, or any other characters or symbols providing the user an indication/information as to the nature and subject of the program. Although, the exemplary embodiments are described below with specific reference to a system for basement, crawlspace or other at least partially subterranean chamber remediation, for example purposes, the features of the present invention are applicable to any other desired system. After the program is initialized, a menu of options may be presented in block 210. A user may select from this menu with user interface 130. The user interface 130 may be a keyboard or touch screen, a hand-held pointing device such as a mouse, or some other device.

Figure 6:
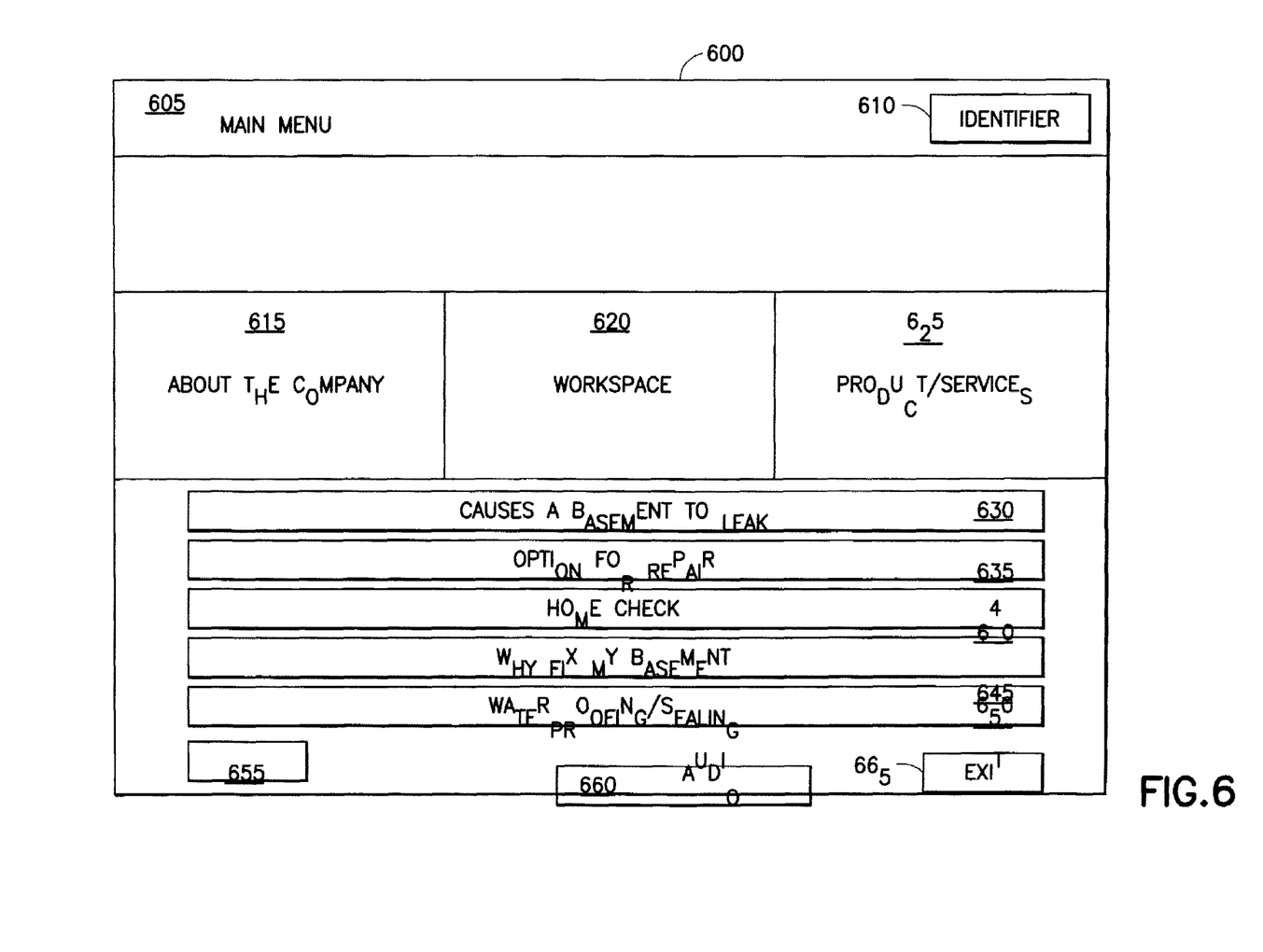
FIG. 6 is a schematic diagram of a screen page displayed on the system in FIG. 1.

FIG. 6 illustrates an exemplary screen page 600 with the menu of options that may be made available for display, on display 120 for example in block 210. Screen page 600 comprises various sections. The arrangement shown in FIG. 6 is merely exemplary, and in alternate embodiments the screen page may have any other desired arrangement. Screen page 600 may be the first or main screen page displayed after initialization. In this embodiment, header bar 605 may appear at the top of screen page 600 and may include basic information. For example, header bar 605 may specify the title of the screen page, such as with the words "Main Menu" appearing at the left side of the header bar. The header bar may have an icon(s) 610, a representative one is shown on the right side for example purposes. Icon 610 may be an emblem of a product manufacturer, vendor or installer.

As seen in FIG. 6, in this exemplary embodiment the screen page 600 may have several selectable sections 615, 620, and 625. Each selectable section may have an image associated therewith and title or other indicia allowing a user to identify a menu option available by selection of the given selectable section. Each selectable section may be selected by the user using the user interface 130, for example by clicking on the section with a mouse. Selection of a selectable section by the user may cause the system to display a different screen page, corresponding to the identified menu option. Each selectable section may alter in appearance when the user seeks to interact with the section, such as by placing the cursor over the section. The location of the cursor might be changed by moving a mouse, or by other means. When the cursor is located over a selectable section, the background of that section may change in color, or a color bar at the bottom of the selectable section may expand to cover substantially all of the background area for that section. In addition, when the cursor is located over one of the selectable sections 615, 620, and 625, an image in that section may be transformed. For example, the object shown in the image may be made to appear to rotate in three dimensional space. Alternatively, the image may be an illustration of a grouping of products or services, and the products appearing may alter in rapid succession as the cursor remains located over the selectable section. That is, different products may be cycled into and out of the image, appearing and then disappearing. Locating the cursor over a major selectable section may also have the effect of causing the system 100 to generate a sound effect.

In the exemplary embodiment, selecting selectable section 615 may facilitate viewing of information about the product manufacturer, vendor, or installer (for example "Basement Systems, Inc."). Selecting major selectable section 620 may cause an image of the workspace (in this embodiment basement or crawlspace), along with a product list, to be displayed. This workspace may appear modified by the installation of user-selected products, as described below. Selecting major selectable section 625 may cause a menu of products/services or product/services presentations to be displayed. In alternate embodiments, more or fewer selectable sections may be provided.

As seen in FIG. 6, screen page 600 may have other selectable sections 630, 635, 640, 645, and 650 located in any desired arrangement. The other selectable sections 630-650 are referred to herein for example purposes as minor selectable sections which may have icon or image on the screen page smaller than the sections 615, 620, 625 for example. In alternate embodiments the minor selectable sections may have a representative image of any desired size. In this embodiment, each minor selectable section may comprise a narrow horizontal band, with descriptive textual information or images appearing thereon. The descriptive text and images may correspond to options which are accessed by selecting the particular minor selectable section. For example, a minor selectable section may have a title such as "Home Check" and an icon of a movie film. This may serve for example as an indication to the user that selecting the selectable section may cause a presentation, such as a video or other desired format, to be shown on the topic of checking a home, or a video with that title. The presentation may be a tutorial with for example explanations, instructions and demonstrative examples for identifying undesired or remedial conditions in the basement/ crawlspace of a home. Other information provided on the minor selectable section(s) may be an indication of the duration of the presentation, i.e. the number of minutes and seconds it takes to view the presentation. Similar to selectable sections 615, 620, 625, the background or other appearance of a minor selectable section may change when the cursor is located over the section. For example, the background may initially be gray but then change to blue when the cursor is located over the section, and again back to gray when the cursor is removed from the section. Moving the cursor over a minor selectable section may also cause the system 100 to generate a sound effect. Selectable sections may be provided, for example for "what causes a basement to leak" presentation, "options for repair" presentation, "why fix basement/crawlspace" presentation and "waterproofing/sealing" presentation. In alternate embodiments, selectable sections may be provided for any other presentations.

In the exemplary embodiment shown in FIG. 6, various other selectable sections may appear at the bottom of screen page 600. For example, a section 655, located in the lower left corner of the screen page 600, may be labeled "CD MAP" and may cause a list of the contents of a CD to be displayed on the visual display screen 120 when it is selected. Also, at the lower right hand corner of the screen page 600 may be located a selectable section 665 labeled "EXIT" which, when selected, allows a user to exit the program. Next to selectable section 665 is selectable section 660, labeled "AUDIO". When the cursor is moved over this section, the section expands and a linear slide is shown that allows the user to adjust the level of sound output from the system.

Figure 7:
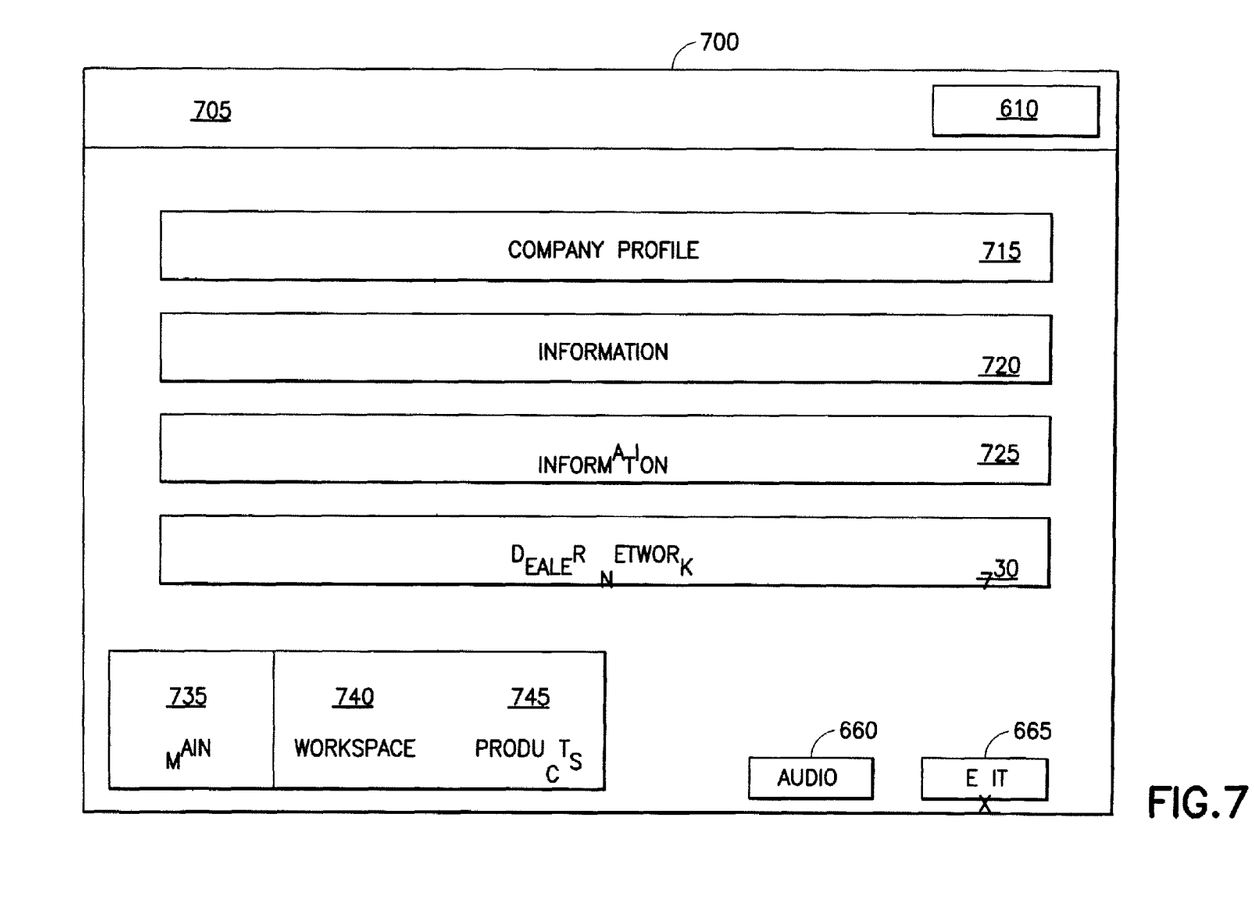
FIG. 7 is another schematic diagram of a screen page displayed on the system in FIG. 1.
Figure 11:
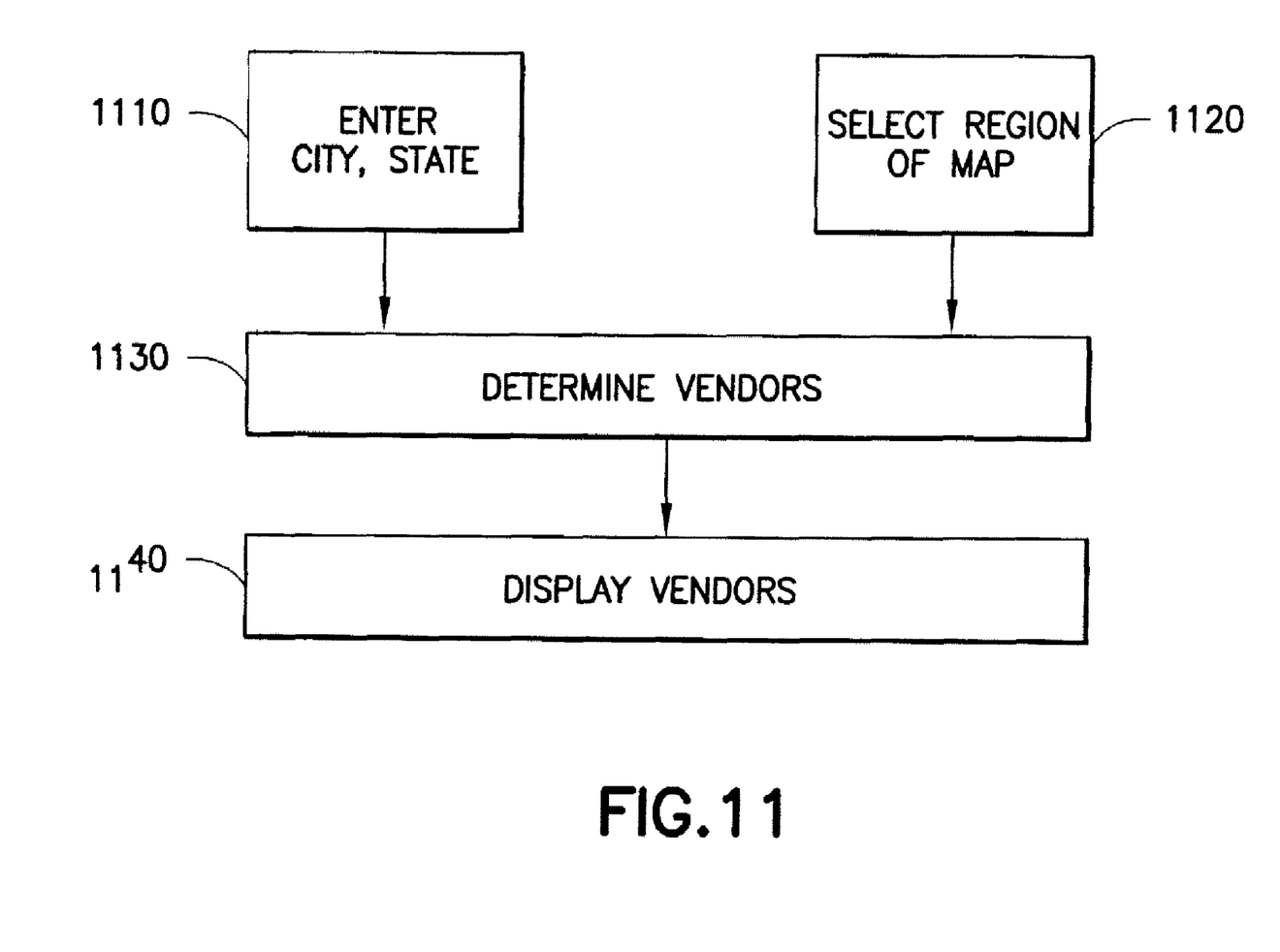
FIG. 11 is another schematic diagram illustrating aspects of the system in FIG. 1.

As noted before, if the user selects section 615 from screen page 600, which section for example may be labeled "About the Company", screen page 700, shown in schematic form in FIG. 7, may be displayed in block 215 in FIG. 2. Screen page 700 shown in FIG. 7 is merely exemplary, and may have any other desired arrangement and features in alternate embodiments. In this embodiment page 700 may have a header bar 705 which is similar to header bar 605 of screen page 700. Header bar 705 may have text or other information related to contents of the page. Screen page 700 may include selectable sections 715, 720, 725, and 730. Each of the selectable sections 715, 720, 725, 730 may be associated with a menu choice, the menu choice being accessed by the user as previously described. Moving the cursor over one of the selectable sections may generate a visual or audio effect. Alternate embodiments may have a different number and arrangement of selectable sections, or no selectable section at all. Each of the selectable sections 715, 720, 725, and 730 may be a graphical image which is representative of the menu selection, such as a reduced scale image of what would appear on visual display screen 120 (see FIG. 1) if that particular section were selected. Each selectable section may have a label that is also indicative of the associated menu option. Selecting one of the selectable sections may cause a presentation such as a video clip, slide show, or still image to appear, or may cause some other activity. Moving the cursor over one of these sections may cause a sound effect to be generated. Screen page 700 may have similar features to page 600, such as "Audio" and "Exit" buttons, 660 and 665. Also appearing on screen page 700 in this embodiment are animated selectable sections 735, 740 and 745. These animated selectable sections 735, 740, and 745 may correspond to selectable sections 615, 620, and 625 from screen page 600. As such, they may have the same labels and/or appearance and access the same menu options, may show the same animated visual effects, and may generate sound effects when the cursor is located over one of them. In one embodiment, selectable selection 735 may allow return to "Main Menu", page 600. In this embodiment, a selectable section 715-730 on screen page 700 may access a portion of the computer program which allows the user to find information on a vendor(s) of the products or supplier of the services featured in the program. FIG. 11 is a flow chart illustrating this procedure in accordance with an exemplary embodiment. A user specifies (e.g. using user interface 130 in FIG. 1), the desired geographic information, such as by entering city and state or other textual geographic information, block 1110 in FIG. 11, or selecting a region of a displayed map by clicking on the map with the mouse, block 1120. In block 1130, the computer system uses a database of vendors and geographic areas, registered in program 200, or stored in memory of the processor 111, 112 and accessed by program 200, to determine which vendors serve the indicated area. Block 1140 of FIG. 11 shows, the names and contact information of the vendors are displayed on display 120.

Figure 10:
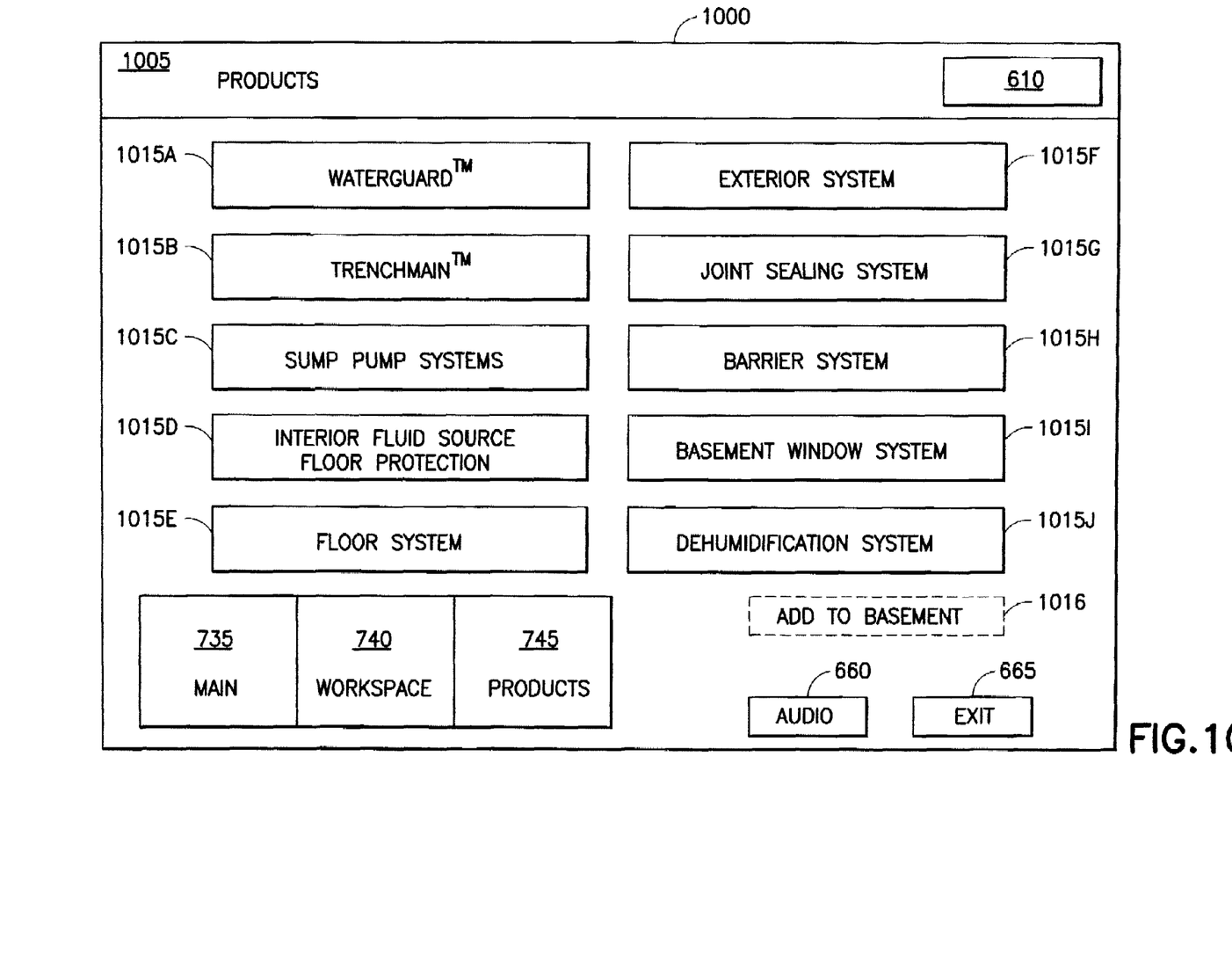
FIG. 10 is still another schematic diagram of a display screen of the system in FIG. 1.

Referring again to FIG. 6, if the user desires to browse or seek more information on available products/services or sales, the user may select the menu of product or sales presentations, such as by clicking on section 625 with the mouse, and in response to which a menu of such presentations appears on the visual display screen 120 (block 245 in FIG. 2). FIG. 10 shows screen page 1000, which displays an exemplary menu of product presentations. In alternate embodiments the screen page may have any desired arrangement. In this exemplary embodiment, screen page 1000 may have a header bar 1005. Header bar 1005 may display an appropriate label, such as "Products", and may for example, have an icon 610 located at the right side. Screen page 1000 also may have selectable sections 735', 740', and 745'. Selectable sections 735', 740', and 735' may have similar appearance and functionality as section 735, 740, 745 on screen page 700, described before. Section 745' corresponding to access of the product information page, may be non-animated and made non-selectable. Screen page 1000 may also have section 660', labeled "Audio", and section 665', labeled "Exit", which have similar functionality to sections 660, 665 described before. Several selectable section(s) 1015 for selecting product presentation(s), or further submenu(s) of product presentation (s), may appear on screen page 1000. In alternate embodiments more or fewer selectable sections may be provided. Each selectable section 1015A-1015J may be labeled with the name of an associated product or set of products and/or services, and may have one or more images on the section which show the associated product(s). Each selectable section 1015A-1015J may alter in appearance when the cursor is placed over the section, such as through a change in background coloration from gray to blue. Each selectable section 1015A-1015J may be selectable, for example by clicking on it with a mouse or touching it on a touch screen, or otherwise selectable. Selecting one of the selectable sections 1015A-1015J may cause either a product presentation to be displayed, or a menu of product presentations. In the exemplary embodiment, the selectable sections 1015A-1015J may correspond to areas or types of remediation features of the representative basement or crawlspace. The presentation(s) queued by a given selectable section 1015A-1015J may be grouped for product(s) and/or service(s) that remediate basement/crawlspace remedial features having some common characteristic or attribute. For example, selectable sections 1015A, 1015B for perimeter drain systems may correspond to basement perimeter floor or sub-floor fluid collection and direction, section 1015C to sump pump systems, section 1015D to interior fluid source floor protection (e.g. leaks from interior tanks and piping connections such as domestic water), section 1015E to floor systems (e.g. dry floor matting), section 1015F to exterior systems (e.g. raw chutes), section 1015G to joint (e.g. foundation wall seam or crack) sealing system, section 1015H to barrier (e.g. vapor), moisture barrier systems, section 1015I to basement window systems and section 1015J to dehumidification systems. In alternate embodiments, selectable sections corresponding to other areas or types of remediation features.

Referring again to FIG. 2, in block 245 the user may select from among the presentations, causing the program to proceed to block 255 or, alternatively, to block 250. After the user selects a product presentation, that presentation may be shown on the screen. Each product presentation may be a static visual image or slide show, or may comprise moving images, audio, or other aspects. Before, during the presentation, or at its conclusion, an option may be presented, for example via a selectable section 1016 (see FIG. 10) displayed on the screen (at any desired time), to the user for adding a product featured in the presentation to a list of selected products. If the product is selected to be added to the list, block 255 in FIG. 2, the computer may proceed directly to display the workspace (block 230 FIG. 2) on the display. In this case, the workspace image is shown on the display modified by the installation of selected products, as will be described below. As may be realized, in this embodiment, selection of a section, for example section 1015A, queues presentations for products, such as the WaterGuard™ drainage products available from Basement Systems, Inc., that collect water at the basement perimeter wall and direct the water to a desired outlet. Thus a user desiring information on products for remediation of a water seepage problem at the basement perimeter wall, may directly investigate such products by selecting product section 625 (screen 600 in FIG. 6) (calling up screen 1000 in FIG. 10) and selecting feature 1015A from screen 1000. The user may select one or more product/service presentations from the set of presentation(s) queued by selection of section 1015A and add the selected product(s)/service(s) using section 1016 as desired. The user may similarly access any desired basement remediation product/service presentation and any desired remediation product/service.

Figure 8:
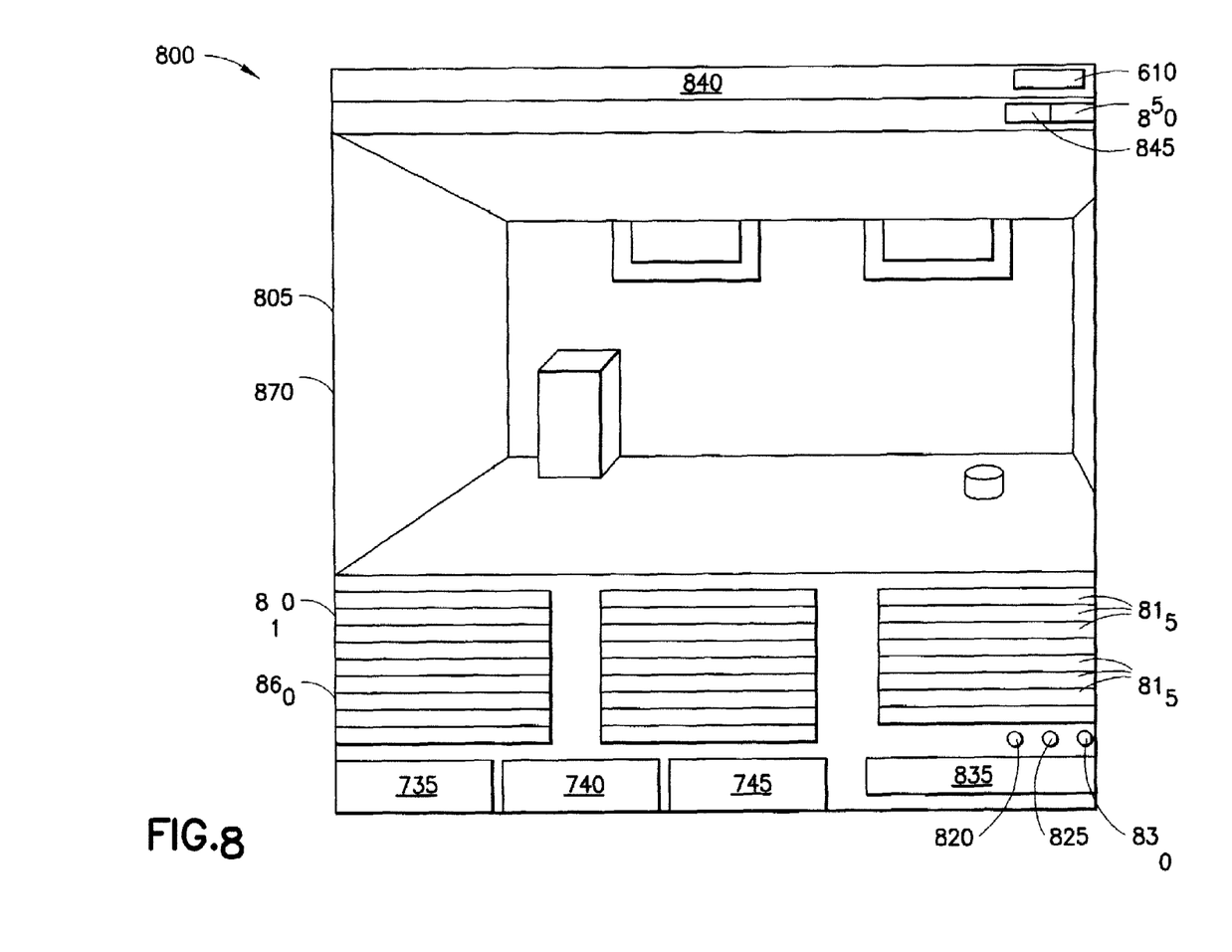
FIG. 8 is yet another schematic diagram of a screen page on the system in FIG. 1.

If the user in block 210 selects to view the workspace, or if a user selects to add a product to the list of selected products, block 255, as described above, an image is displayed showing the basement/crawlspace workspace 870 (see FIG. 8). FIG. 8 shows an exemplary screen page 800 that may be called up by selecting section 620 (see FIG. 6) of section 1016 (see FIG. 10). In this exemplary embodiment, portion 805 of the screen page is an image 870 of the workspace. In this embodiment, the image 870 shows a basement crawlspace or partially subterranean chamber (i.e. has visual or other features allowing a user to understand the image is of basement etc.) As will be described in greater detail below, the workspace image may be shown in an initial condition and as modified by the installation of selected products or by performance of various services. In the initial condition, the basement image may have visual or other cues indicating to the user a representative condition of the basement workspace with features in which remediation is desired. For example, in the initial condition the imaged basement workspace may appear dark, damp, and otherwise generally unappealing. Then, as products are selected and added to the list, the basement image is modified to illustrate the installation of those products in the basement. This modified basement image may have visual or other cues indicating that product installation effects remediation of the basement, for example may appear more appealing and convey the idea that an actual basement will be dryer, cleaner, and brighter after installation of the selected products, and that the undesired effects from water or other fluids in the basement would be decreased or eliminated. The products may appear as installed in appropriate places. For example, a drain would appear on the floor, wall covering on walls, window seal on a window, and so forth. The workspace images and features therein may be schematic or representative and may not appear fully realistic, through they may in some embodiments. For example, the image of the workspace may be a generic image of a basement rather than an image of the actual site of installation. Similarly, while the program may allow the user to choose the location for the products to appear, the location may instead be pre-defined in the computer code. Also, the number of products appearing on the screen may or may not correspond to the exact quantity selected. For example, a generic basement image may show two basement windows while a user may specify more than two basement window seals. In such a case, two seals may appear on the modified image. Displaying an image of a workspace as modified by the installation of selected products may aid the user in remembering what products were selected and/or ordered.

Figure 3:
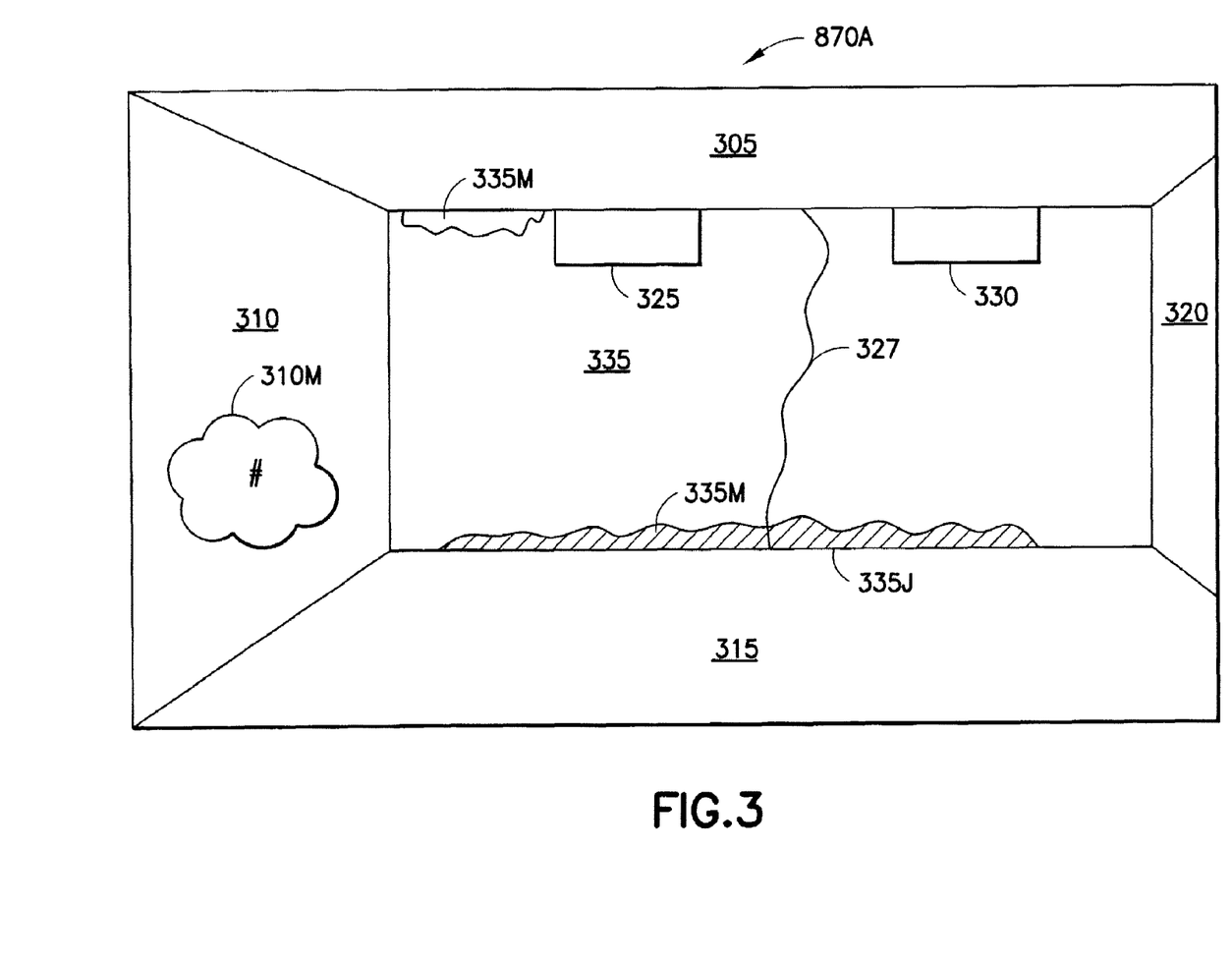
FIG. 3 is a schematic depiction of an initial image of a workspace or installation environment displayed by the system in FIG. 1.

FIG. 3 illustrates schematically the image 870A of the basement workspace in the initial condition. In this embodiment, the basement workspace depicted in the image appears as being viewed from a side perspective as if standing within the basement. In alternate embodiments, the perspective of the workspace image may be as desired. The workspace image in this embodiment has rear wall 335, side walls 310 and 320, floor 315, and ceiling 305. In the rear wall 335 are two windows 325, 330. As noted before, one or more of the basement features may have visual or other cues indicating a remedial condition due to for example underground water seepage or other environmental condition affecting basements. For example, the walls 310, 320, 335 may be shown with darkened areas 310M, 335M indicating mildewed regions due to dampness. The mildew regions 310M, 335M may be positioned to indicate areas of higher moisture where some remediation may be desired. For example, wall 335 may be shown as a poured concrete wall which generally is subject to moisture from underground water infiltration at the wall to slab joint 335J. Accordingly, in this embodiment mildew region 335M is shown proximate area of moisture along joint 335J. Other mildew areas 335M may be due to infiltrating moisture past window 325, or from collecting moisture due to a damp/wet basement. Wall 310, shown as a hollow core (cinder) block wall which is quite porous, has mildew region 310M substantially covering the wall face indicating possible moisture penetration through the entire wall and that remediation may be useful for the wall rather than localized region. The initial image 870A may show other remedial features such as a wall crack 327. In alternate embodiments, the initial image of the basement may have more or fewer and different basement features, and the remediation indicating characteristics may be illustrated in any desired manner (e.g. showing areas of standing water, or symbols, labels identifying the type of remedial condition.)

Figure 4:
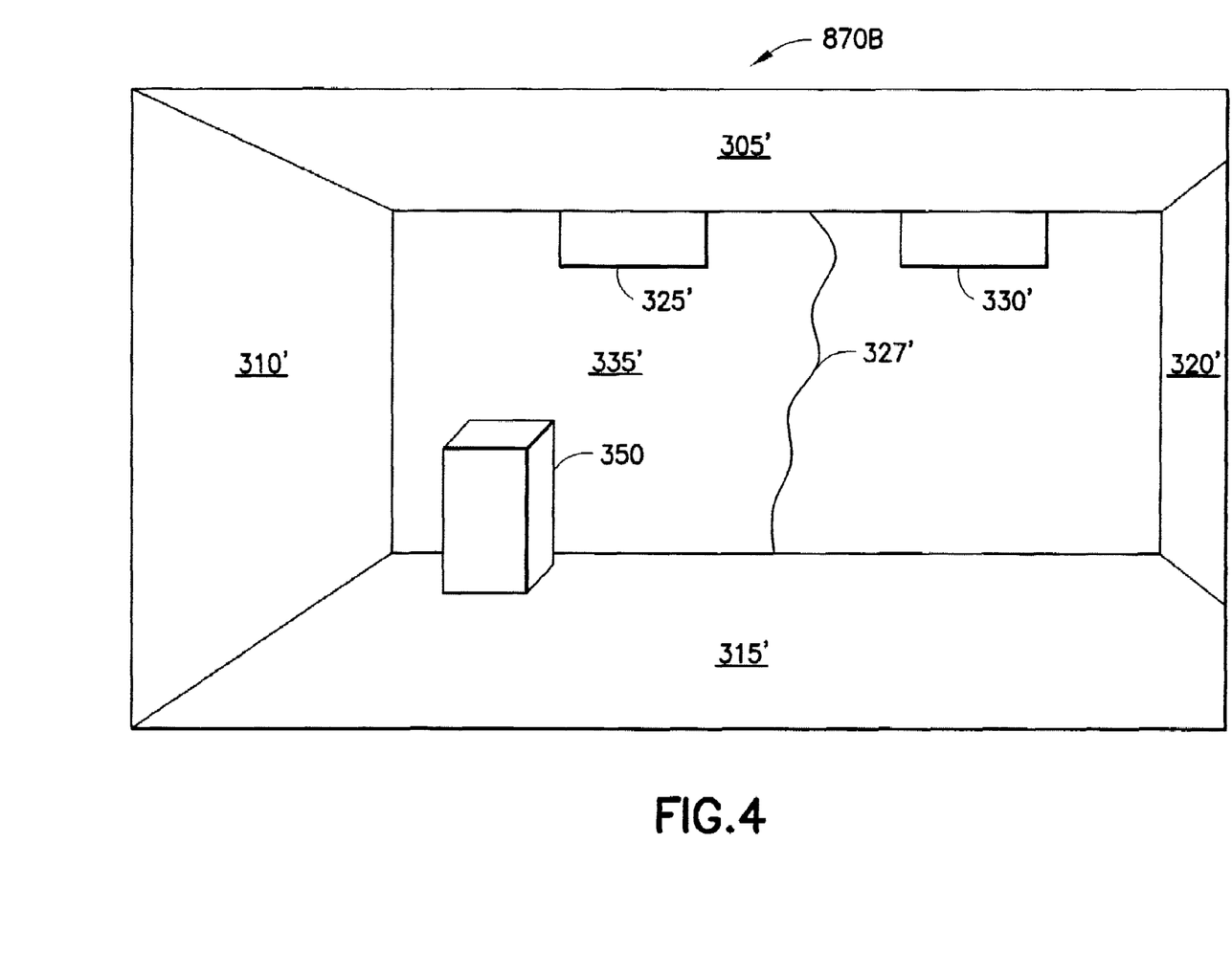
FIG. 4 is another schematic depiction of a modified image of the workspace or installation environment.
Figure 5:
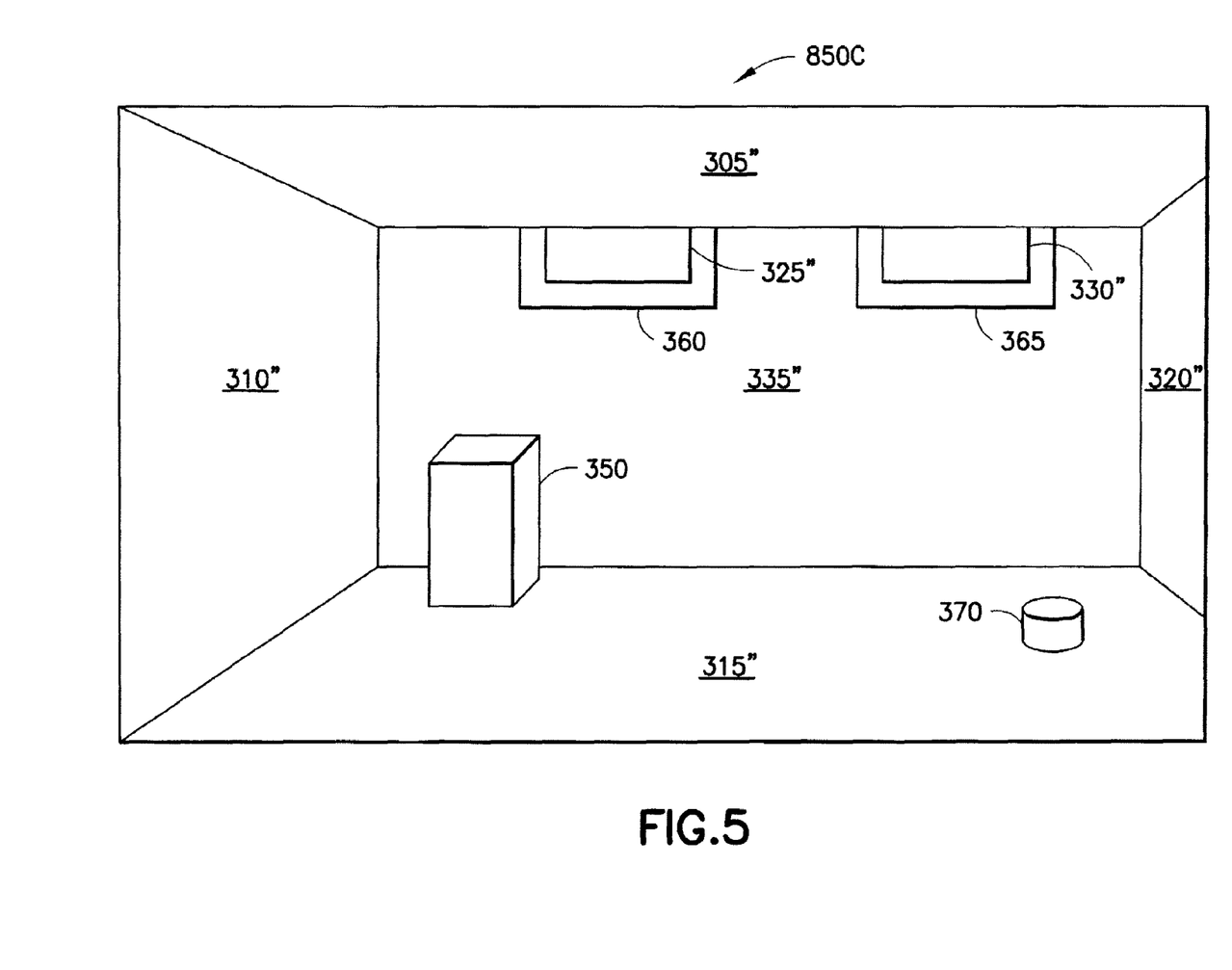
FIG. 5 is yet another schematic depiction of a further modified image of the workspace or installation environment.

FIG. 4 shows the modified image 870B of the workspace in FIG. 3 modified by the addition of a product 350, which in this example may be a dehumidifier. The basement workspace in the modified image 870B in FIG. 4, is substantially similar to the basement workspace in image 870A in FIG. 3 and similar features are similarly numbered. The modified image, as noted before, may be generated by selection of a product by the user (see block 230, 255 in FIG. 2). In addition to the inclusion of the selected product (dehumidifier 350), the basement features (e.g. walls 310', 320', 335') in the modified image 870B may be changed, relative to the appearance in the initial image 870A in FIG. 3, to show a change (i.e., improvement elimination) in remedial conditions affected by selected product(s)/service(s) installation. For example, mildew areas 310M, 335M (shown in FIG. 3) may be eliminated, reduced or shown changed in appearance in the modified image 870B (FIG. 4) to indicate a general reduction in mildew on the walls 310', 320', 335' due to addition of the dehumidifier 350. Deselection of the selected product returns the displayed image to the initial condition. Selection of further products causes the basement image to be further modified to add the selected products and account for the remediative effects of those products to the basement features depicted in the image. For example, FIG. 5 shows the image 870C further modified from the image 870B in FIG. 4 by the addition of other selected products such as window enclosures 360, 365 and drainage pump 370. Note that the products are shown in appropriate places. The drainage pump 370 is shown on the floor and window enclosures 360, 365 are shown on the windows 325", 330". The appearance of the windows 325", 330" is changed relative to that shown in images 870A, 870B to show the remediative effects of installation of the window enclosures 360, 365. Other embodiments may of course use different products and different workspaces or installation environments.

As noted before, FIG. 8 shows screen page 800, for example displayed in block 230. As seen in FIG. 8, in this exemplary embodiment, screen page 800 may be divided principally between two major portions. In alternate embodiments, the screen page may have any desired configuration. Top portion 805 has image 870 of the workspace, as shown in FIGS. 3-5 and described above. Bottom portion 810 of screen page 800 shows a product(s)/service(s) menu. In this embodiment the menu in bottom portion 810 comprises a plurality of item sections 815. The menu may be continuously displayed or may be a pull down menu (e.g. the sections 815 may appear on demand). Each item section 815 may be associated with a particular product or service and appropriately labeled to indicated that product or service. The product(s)/service(s) of item sections 815 may correspond to product/service presentations accessible from screen page 1000 shown in FIG. 10 and described before. In alternate embodiments, item sections may be provided for more or fewer product(s)/service (s). The product(s)/service(s) of item sections 815 may be applicable to one or more of the basement features shown in basement image 870. Selection of an item section, as will be described below, may generate a modified image (similar to image 870A, 870B) of the workspace with the associated product/service shown in an applied or installed condition. The item sections 815 may collectively form a list of materials 860.

Figure 9:
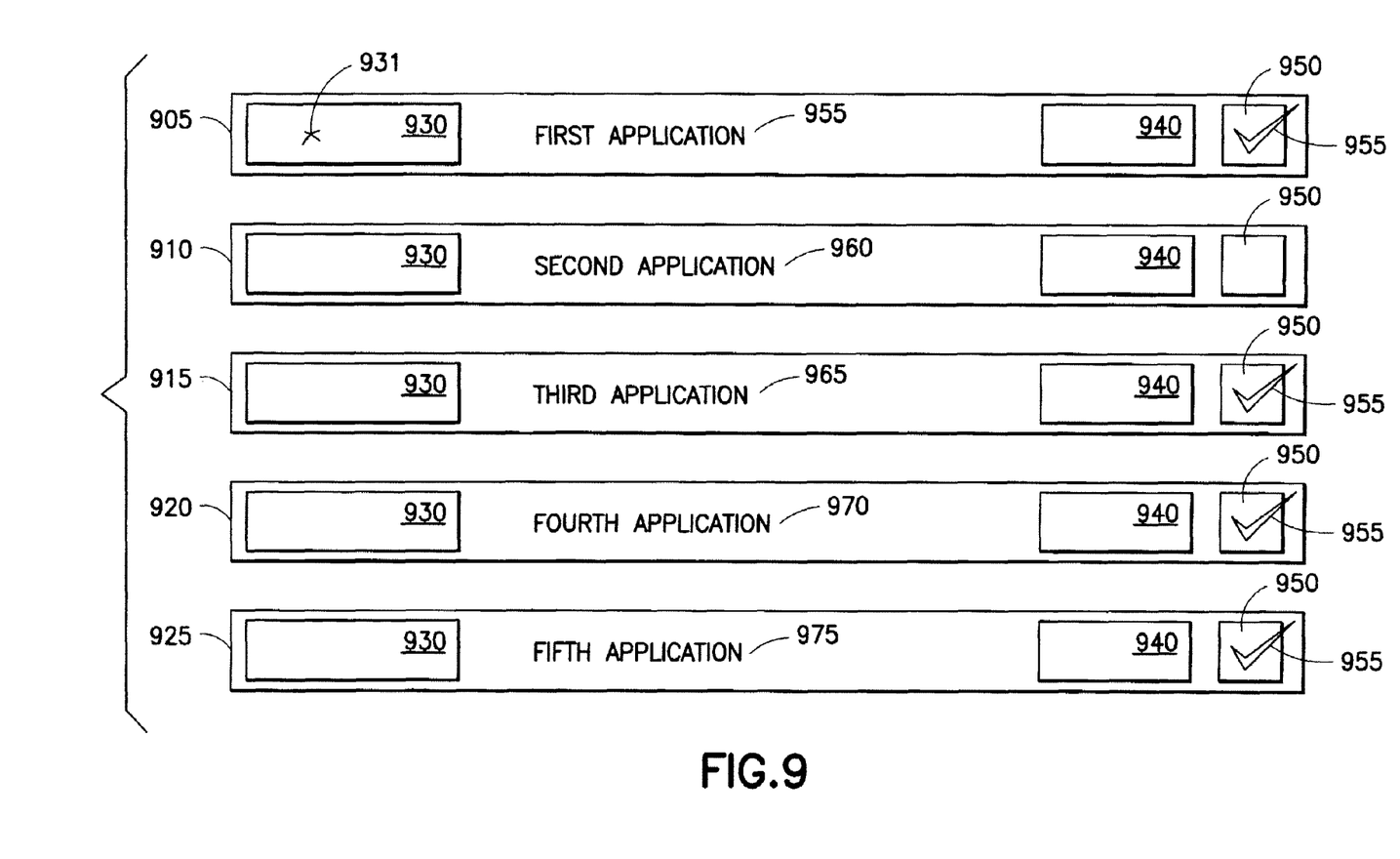
FIG. 9 is an enlarged portion of the screen layout diagram in FIG. 8.

FIG. 9 shows some of the item sections 815 of FIG. 8, enlarged to show detail. Five item sections, 905, 910, 915, 920, and 925 are shown for example purposes. Each has an appropriate label 955, 960, 965, 970, and 975, respectively, which indicates the product or service represented by that particular item section. Each item section 815 may have a sourcing specifier such as quantity or color or other sourcing characteristic indicator 930 for displaying the sourcing specifier 931 of the item which has been selected. In addition, each item section may have an item price indicator 940, for displaying the price of the selected product of the item. A check box 950 is also displayed in each item area, and a check 955 is displayed in the check box if the item has been selected. Any text appearing in the item section, such as the label and indications of price and quantity, may also appear darker or otherwise emphasized if the item has been selected, as compared with the appearance without selection of the item. Selection of an item section 815 may be effected with the user interface. If the user clicks on an item section 815, a pop-up box may be displayed with an option to change the quantity of product selected for the product corresponding to that item section. In alternate embodiments, selection of an item section 815 may also call up a product presentation for the associated product. Selection of the item section causes the processor to generate a list of selected product(s)/service(s) that is updated with each item section selection or deselection.

Referring again to FIG. 8, bottom portion 810 further comprises a total register 835 and indicators 820, 825, and 830. The total register 835 may have an appropriate label such as "Total Investment", along with a numeric display of the total price of all of the selected items. The indicators 820, 825 and 830 which may be color coded for example, green 820, yellow 825, and red 830, respectively, resembling a traffic light turned on its side, may operate to allow the user to alter the information displayed in the item sections. For example, with the green color indicator 820 selected, all price information may be displayed. With the yellow color indicator 825 selected, the item price indicators 940 of the item sections 815 may appear blank while total indicator 835 still displays the total price of the selected products and services. Selecting red color indicator 830 may cause all price information to be removed from screen page 800. Each indicator may be selected by clicking on it, and may appear brighter or otherwise altered in appearance when selected. Indicator 820 may be initially selected as a default, with the user able to change from the default selection. Selecting any one of the indicators 820, 825, or 830 may automatically cause the other color indicators to be de-selected and therefore return to their normal, less bright appearance. Also appearing on screen page 800, at the bottom thereof, are selectable sections 735', 740', and 745' similar to selectable sections 735, 740, 745 that appear on screen page 700 (FIG. 7) and are described above.

In this embodiment, screen page 800 also has a header bar 840 with an appropriate label, such as "My Basement". Icon 610 also appears at the right of header bar 840. Screen page 800 may further have two selectable sections or buttons 845 and 850 positioned as desired. Section 845 may be labeled "Save" and may be selectable for saving the current list of selected items and if desired the current configuration of the workspace image to a suitable storage location of the processor such as a hard disk or other device. Section 850 may be labeled "Print" and may be selectable for printing the current list and/or image of the workspace as modified by the installation of the user selected products, the inventory, or other information. In other embodiments, screen page 800 may have additional functionality, such as an option for generating a purchase order.

If in block 230 FIG. 2, the user elects to have the program generate a purchase order, the computer will obtain a price in block 235 for each product. This may be accomplished in a variety of ways. For example, if the computer code is distributed on compact disks, each disk may have a spreadsheet file or table indicating prices, or price information may be stored in another format or medium. Alternatively, the computer may query another computer that is remote from the user, to obtain current price information. The internet or any other suitable form of networking or non-networked communication may also be used. If the computer is an in-store kiosk, this communication may be performed using TCP/IP protocol on a local area network. In addition to its use in generating a purchase order, the price information may be used as a data source for item price indicators 940 and total indicator 835 on screen page 800. In some embodiments, the code also may be configured to calculate special rebates, quantity discounts, and the like in generating a purchase order. In block 235, the computer processor 110 may use the price information to generate a purchase order. The purchase order may then be displayed to the user on the visual display screen 120. Also in block 235, an option may be presented to the user to submit the purchase order. If the option is selected, the purchase order is sent, in block 240 of FIG. 2, to a desired processing center for execution. In some embodiments, the purchase order may be electronically submitted to a manufacturer, vendor, installer, or other recipient. For example, if the code is implemented with a web page, a purchase order may be electronically submitted from computer processor 110 to a remote web page server, such as that of a manufacturer, vendor or installer.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the claims.

What is claimed is:

1. A system for marketing subterranean chamber remediation applications, the system comprising:
   a computer processor;
   a display operably connected to the computer processor; and
   a user interface for receiving instructions from a user, the user interface being operably connected to the computer processor;
   wherein the computer processor is programmed to display a subterranean chamber remediation application menu on the display for selection of an application from the subterranean chamber remediation application menu by the user;
   wherein the computer processor is further programmed to maintain a list of user-selected applications;
   wherein the computer processor is further programmed to display an initial depiction of a predetermined environment in an initial condition including images of predetermined areas of the predetermined environment shown in a deficient subterranean chamber condition for remediation on the display, and further programmed to display an updated depiction of the predetermined environment including images of applications included in the list of user-selected applications shown applied in the predetermined environment; and
   wherein the computer processor is further programmed to update the initial depiction of the predetermined environment by adding an image of the application, as applied in the predetermined environment, to the initial depiction of the predetermined environment on the display and replacing at least one of the images of the predetermined areas shown in the deficient subterranean chamber condition with the image of the application, in response to a selection of the application by the user.

2. The system of claim 1 wherein the predetermined environment is an at least partially subterranean chamber and the application is at least one of a product or service for waterproofing or sealing the at least partially subterranean chamber.

3. The system of claim 1 wherein the computer processor is further programmed to display a menu of application presentations, for selection by the user, and to display a user-selected application presentation.

4. The system of claim 3 wherein the application presentations comprise at least one moving image.

5. The system of claim 3 wherein the application presentations comprise at least one still image.

6. The system of claim 3 further comprising an audio device, wherein the application presentations comprise audible content broadcast by the audio device.

7. The system of claim 1 wherein the display and user interface comprise a touch screen.

8. The system of claim 1 wherein the user interface comprises a hand-held pointing device.

9. The system of claim 1 wherein the computer processor is further programmed to allow user specification of predetermined characteristics of selected applications, is programmed to obtain prices of the selected applications, and is programmed to generate a purchase order for the selected applications and specified predetermined characteristics.

10. The system of claim 1 wherein the computer processor comprises a proximate processor portion and a remote processor portion, and wherein the proximate processor portion is connected to the remote processor portion via the internet.

11. The system of claim 1 wherein the computer processor is further programmed to display information of application providers within a user-specifiable predetermined geographical location.

12. The system for marketing subterranean chamber remediation applications of claim 1, wherein the user may select applications and see changes to the depiction without changing screens.

13. A computer code embedded in a computer-readable medium, comprising:
   instructions for displaying an initial image of an arrangement of features related to a workspace to be modified, the initial image depicting the workspace to be modified in an initial condition including images of the workspace shown in a deficient subterranean chamber condition for remediation;
   instructions for displaying a subterranean chamber remediation application presentations menu;
   instructions for allowing a user to select an application presentation from the subterranean chamber remediation application presentations menu;
   instructions for storing a list of selected applications in a computer memory;
   instructions for allowing a user, while viewing the selected application presentation, to add an application associated with the selected application presentation to the list of selected applications; and
   instructions for displaying a modified image of the arrangement of features related to the workspace, showing the selected applications as applied to the workspace, the modified image replacing at least one of the images of the workspace shown in the deficient subterranean chamber condition with an image of the selected applications.

14. The computer code of claim 13 wherein the list of selected applications is shown simultaneously with the modified image of the arrangement of features related to the workspace.

15. The computer code of claim 13 wherein the list of selected applications includes an indication of a user specified characteristic of the selected application.

16. The computer code of claim 13 further comprising instructions to generate a purchase order from the list of selected applications.

17. The computer code of claim 13 wherein the modified image of the arrangement of features related to the workspace comprises a two-dimensional perspective representation of a three-dimensional workspace, showing the applications as applied to the workspace.

18. The computer code of claim 13, wherein the features of the image are related to an at least partially subterranean chamber.

19. The computer code of claim 18, wherein the features have predetermined characteristics so that the image indicates a remedial condition associated with each of the features.

20. A computer code embedded in a computer-readable medium, comprising:
- instructions for displaying an initial image of an arrangement of features indicating a chamber that is at least partially subterranean, the initial image depicting the chamber in an initial condition including images of the chamber shown in a deficient subterranean chamber condition for remediation;
- instructions for displaying a subterranean chamber remediation applications menu for the chamber;
- instructions for allowing a user to select an application from the subterranean chamber remediation applications menu, and to specify a predetermined characteristic of said application;
- instructions for storing a list of selected applications and user specified characteristics in a computer memory;
- instructions for displaying a modified image of the arrangement of features indicating the chamber, showing the applications as applied to the chamber, the modified image replacing at least one of the images of the chamber shown in the deficient subterranean chamber condition with an image of the selected applications;
- instructions for obtaining a price for each selected application; and
- instructions for generating a purchase order for the list of selected applications and user specified characteristics.

21. The computer code of claim 20 wherein the applications are goods or services for waterproofing or sealing the chamber.

22. The computer code of claim 20 further comprising instructions for simultaneously displaying the menu of applications and the image of the arrangement of features.

23. The computer code of claim 20 wherein the instructions for obtaining the price for each selected application comprise instructions for obtaining the prices from a remote computer.

24. The computer code of claim 20 further comprising instructions for submitting the purchase order to a remote computer.

* * * * *